(No Model.)

W. C. D. PAGE.
METHOD OF REGULATING THE TEMPERATURE OF WATER AND OTHER LIQUIDS, AND MECHANISM THEREFOR.

No. 247,212. Patented Sept. 20, 1881.

WITNESSES
E. A. Phalen.
N. C. Fogg.

INVENTOR
Wm. C. D. Page
by his attys
Clarke & Raymond

UNITED STATES PATENT OFFICE.

WILLIAM C. D. PAGE, OF CAMBRIDGE, ASSIGNOR OF ONE-HALF TO STEPHEN A. FERRIN, OF BOSTON, MASSACHUSETTS.

METHOD OF REGULATING THE TEMPERATURE OF WATER AND OTHER LIQUIDS, AND MECHANISM THEREFOR.

SPECIFICATION forming part of Letters Patent No. 247,212, dated September 20, 1881.

Application filed March 3, 1881. (No model.)

*To all whom it may concern:*

Be it known that I, WILLIAM C. D. PAGE, of Cambridge, in the county of Middlesex, State of Massachusetts, a citizen of the United States, have made a certain new and useful Improvement in the Method of Regulating the Temperature of Water and other Liquids, and Mechanism therefor, of which the following is a full, clear, and accurate description, reference being had to the accompanying drawings, forming a part of this specification, in explaining their nature, in which—

Figure 1:
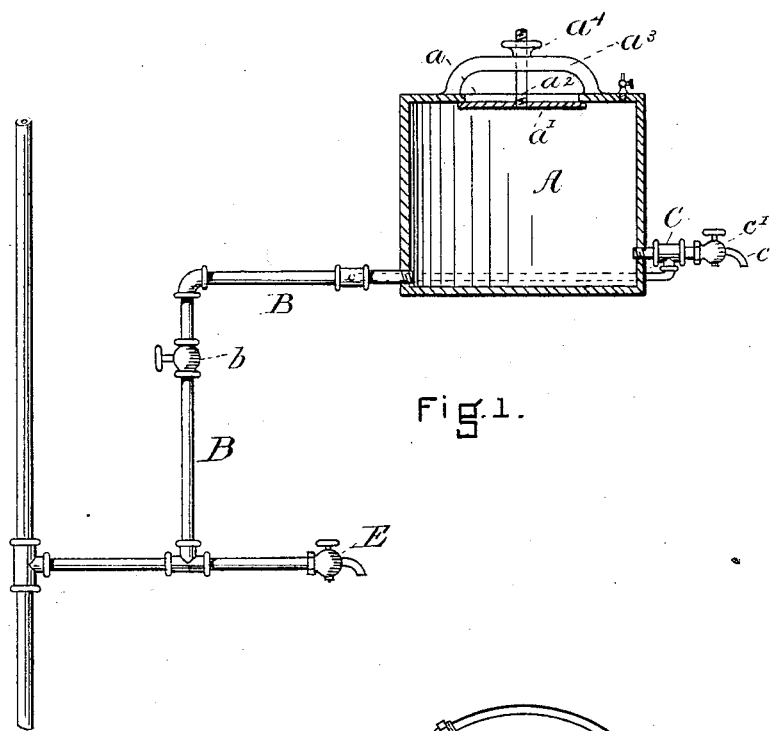
Figure 2:
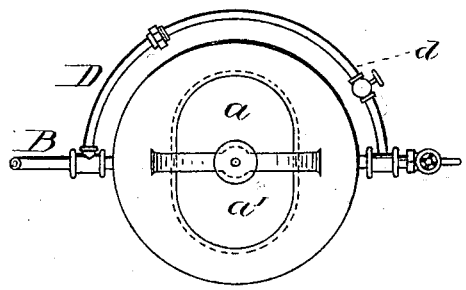

Figure 1 is an elevation, partly in section, of one form of device for practicing my improved method, and Fig. 2 is a plan view of a portion thereof.

It is desirable, for obvious reasons, that water or other liquids be cooled to a temperature lower than the temperature at the source of supply, but not so low as that caused by the cooling of the entire quantity of water or liquid with ice; and my invention consists in a method and device for accomplishing this object in a cheap and simple manner.

It consists in a dispensing apparatus comprising a water-tight tank for holding ice, a supply-pipe connecting the source of supply of the water or other liquid with the tank, a delivery-pipe connecting the tank with a delivery nozzle or orifice provided with a suitable valve or cock, a branch pipe connecting the supply-pipe directly with the delivery-pipe, and having a controlling-valve, all arranged so that a portion of the liquid passes through the tank and is cooled by the ice, while another portion is carried about the tank, mingled with the cooled portion in the delivery-pipe, and discharged therewith from the nozzle. The temperature of the water or liquid delivered from the nozzle is varied according as the quantity of uncooled liquid used is greater or less, and the supply can be regulated to provide as little or as much as may be desired to moderate the temperature of the iced liquid.

In the drawings, A represents one form of tank for holding the ice for cooling the liquid. It may be made of metal or wood, and is provided with an opening, $a$, by which the ice is put in, and which is closed by a gate, $a'$, which, preferably, is arranged to close from the inside, so that the pressure of the liquid therein shall be of advantage in holding it to its seat. I prefer to use the screw-rod $a^2$, which passes through the cross-bar $a^3$ and a screw-wheel, $a^4$, in bringing and holding the gate to its seat, and a rubber or other packing may be arranged about the joint between the gate and seat to more effectively seal it. I do not confine myself to the use of this form of tank, however, in practicing my invention, but may employ any other adapted to receive ice and to cool liquids, provided it is made a part of the dispensing device herein described.

The supply-pipe B connects the source of supply of the liquid, which may be a street-main, a barrel, a reservoir, or any convenient receptacle, with the tank, and it may be provided with the valve $b$. The delivery-pipe C connects the tank with the delivery nozzle or orifice $c$, and a dispensing valve or cock, $c'$, is arranged in the pipe or nozzle. The branch pipe D connects the supply-pipe B or the source of supply directly with the delivery-pipe C between the tank and the dispensing valve or cock; but the branch pipe does not pass through the tank. It has a valve or cock, $d$, by which the flow of liquid through it may be varied.

The operation of the apparatus is as follows: Ice is put into the tank through the gate, liquid is let in and cooled. The liquid is also allowed to pass about the tank from the supply or supply-pipe into the delivery-pipe. In dispensing the liquid the cooled and uncooled mix in the delivery pipe and nozzle, and the cooled is moderated to any extent by varying the quantity of the uncooled by means of the valve $d$.

This method is admirably adapted for dispensing mineral waters, lager-beer, and like beverages, and for all uses wherein it is desired to provide liquids with different temperatures, and then to mix them and draw. This appliance may be used in connection with a valve, E, for drawing liquid directly from the source of supply and without varying its temperature, and such a construction would be preferable in adapting this invention for use in a street-fountain for man and beast; and as I do not confine myself to the location which the refrigerating-tank shall bear to the point of discharge or to the valve or outlet E, it will readily be seen that the invention can be very simply embodied not only into a street-fountain, but into a fountain or stand for dispensing beverages similar to those now employed for soda-water, &c.

It will be observed that the tank A is water-tight, and that when the ice has been introduced therein, and the water or other liquid let in, the iced liquid will be under the pressure of the main or source of supply, and that as fast as the liquid is drawn from the tank the uncooled liquid takes its place, the tank being always full. This provides for a more economical use of the ice.

Having thus fully described my invention, I claim and desire to secure by Letters Patent of the United States—

1. The method of regulating the temperature of liquids drawn by a pipe from a common source of supply, consisting in cooling a portion of the liquid between the source of supply and the point of delivery, and in automatically mixing with the cooled portion, between the cooling apparatus and the dispensing-valve, a quantity of uncooled liquid, all substantially as and for the purposes set forth.

2. The combination of the supply-pipe B, the refrigerating-tank A, the delivery-pipe C and dispensing-valve c', and a branch pipe, D, connecting the supply-pipe with the delivery-pipe, and either with or without the valve d, all arranged to operate substantially as described.

3. The combination of a refrigerating apparatus having a delivery-pipe controlled by a suitable cock and the pipe D, entering said delivery-pipe between the refrigerating apparatus and the cock, all substantially as and for the purposes described.

4. The combination of the supply-pipe B, the refrigerating-tank A, the delivery-pipe C, the valve c', the branch pipe D and its controlling-valve, and a valve or cock, E, all substantially as and for the purposes described.

5. The combination of the water-tight tank A for holding ice, means for supplying said tank with liquid under pressure and continuously, and the delivery-pipe and dispensing-valve, all substantially as and for the purposes described.

WM. C. D. PAGE.

Witnesses:
F. F. RAYMOND, 2d,
W. C. FOGG.